United States Patent
Garg et al.

(10) Patent No.: US 10,248,487 B1
(45) Date of Patent: Apr. 2, 2019

(54) ERROR RECOVERY FOR MULTI-STAGE SIMULTANEOUSLY RUNNING TASKS

(71) Applicant: VIOLIN SYSTEMS LLC, San Jose, CA (US)

(72) Inventors: Amit Garg, Cupertino, CA (US); Vikas Ratna, Fremont, CA (US)

(73) Assignee: VIOLIN SYSTEMS LLC, San Jose, CA (US)

( * ) Notice: Subject to any disclaimer, the term of this patent is extended or adjusted under 35 U.S.C. 154(b) by 0 days.

(21) Appl. No.: 15/003,512

(22) Filed: Jan. 21, 2016

Related U.S. Application Data

(60) Provisional application No. 62/108,315, filed on Jan. 27, 2015.

(51) Int. Cl.
*G06F 11/07* (2006.01)
*G06F 9/48* (2006.01)

(52) U.S. Cl.
CPC .......... *G06F 11/076* (2013.01); *G06F 9/4881* (2013.01); *G06F 11/0721* (2013.01); *G06F 11/0769* (2013.01)

(58) Field of Classification Search
CPC ..................................................... G06F 11/07
USPC ................................. 714/38.1; 718/102, 103
See application file for complete search history.

(56) References Cited

U.S. PATENT DOCUMENTS

| | | | | |
|---|---|---|---|---|
| 5,084,816 A * | 1/1992 | Boese | .................... | B82Y 15/00 370/225 |
| 6,049,817 A * | 4/2000 | Schoen | .................... | G06F 8/458 718/102 |
| 6,219,802 B1 * | 4/2001 | Beeker | ................ | G06F 11/3684 707/999.006 |
| 7,840,857 B2 * | 11/2010 | Breiter | ................ | G06F 11/0709 714/48 |
| 7,979,870 B1 * | 7/2011 | Pulsipher | .......... | H04L 29/08648 709/201 |
| 2003/0018682 A1 * | 1/2003 | Katayama | ............. | G06F 9/5022 718/102 |
| 2003/0056020 A1 * | 3/2003 | Chaudhry | ............... | G06F 9/544 719/313 |
| 2005/0273652 A1 * | 12/2005 | Okawa | .................... | G06F 9/505 714/10 |
| 2007/0168861 A1 * | 7/2007 | Bell | ...................... | G06F 3/0481 715/701 |
| 2008/0172674 A1 * | 7/2008 | Yee | ....................... | G06F 9/5038 718/106 |
| 2011/0078691 A1 * | 3/2011 | Yildiz | .................... | G06F 9/461 718/103 |

(Continued)

*Primary Examiner* — Kamini B Patel

(74) *Attorney, Agent, or Firm* — Schwabe Williamson & Wyatt

(57) ABSTRACT

A method of managing a server is described where a service performed by a task executing on the server is configured into a plurality of sub-tasks, which may be further configured into a plurality of subsidiary tasks. When a subsidiary task executes, the completion thereof is determined to be either a successful or an unsuccessful completion. The completion status of the ensemble of subsidiary tasks is assessed on each completion of a subsidiary task, and the failure of any subsidiary task to successfully complete is deemed to be a failure to complete of the server task. The failure to complete is reported to the requesting application without waiting for the completion of any pending subsidiary task.

5 Claims, 4 Drawing Sheets

(56) References Cited

U.S. PATENT DOCUMENTS

| | | | | |
|---|---|---|---|---|
| 2011/0126209 A1* | 5/2011 | Housty | | G06F 9/4405 |
| | | | | 718/105 |
| 2011/0145037 A1* | 6/2011 | Domashchenko | | G06Q 10/06 |
| | | | | 705/7.27 |
| 2011/0302583 A1* | 12/2011 | Abadi | | G06F 17/30545 |
| | | | | 718/102 |
| 2015/0007185 A1* | 1/2015 | Dey | | G06F 9/4843 |
| | | | | 718/102 |
| 2015/0026698 A1* | 1/2015 | Malakhov | | G06F 9/5066 |
| | | | | 718/105 |

\* cited by examiner

|    | T1 |   | T2 |   | T3 |   | T4 |   | T5 |   |
|----|----|----|----|----|----|----|----|----|----|----|
|    | C  | F  | C  | F  | C  | F  | C  | F  | C  | F  |
| S1 | 1  |    | 1  |    | 1  |    | 1  |    |    | 1  |
| S2 | 1  |    | 1  |    | 1  |    | 1  |    |    |    |
| S3 | 1  |    | 1  |    | 1  |    | 1  |    |    |    |
| S4 | 1  |    |    | 1  | 1  |    | 1  |    |    |    |
| S5 | 1  |    |    |    |    | 1  | 1  |    |    |    |

| FC | 1 | 0 | 0 | 1 | 0 | 2 |
|----|---|---|---|---|---|---|
| SC | 0 | 1 | 1 | 0 | 1 | 3 |

FIG. 3A

|    | T1 |   | T2 |   | T3 |   | T4 |   | T5 |   |
|----|----|----|----|----|----|----|----|----|----|----|
|    | C  | F  | C  | F  | C  | F  | C  | F  | C  | F  |
| S1 | 1  |    | 1  |    | 1  |    | 1  |    | 1  |    |
| S2 | 1  |    | 1  |    | 1  |    | 1  |    | 1  |    |
| S3 | 1  |    | 1  |    | 1  |    | 1  |    | 1  |    |
| S4 | 1  |    | 1  |    | 1  |    | 1  |    | 1  |    |
| S5 | 1  |    | 1  |    | 1  |    | 1  |    | 1  |    |

| FC | 1 | 1 | 1 | 1 | 1 | 5 |
|----|---|---|---|---|---|---|
| SC | 0 | 0 | 0 | 0 | 0 | 0 |

ERROR RECOVERY FOR MULTI-STAGE SIMULTANEOUSLY RUNNING TASKS

This application claims the benefit of U.S. provisional application Ser. No. 62/108,315, filed on Jan. 25, 2015, which is incorporated herein by reference.

TECHNICAL FIELD

The subject matter of the present application may be related to computer systems and communications systems operation.

BACKGROUND

Transactions in computing systems are usually clarified as stateless or stateful. Having state, or being stateful, means that a first device is keeping track of second device. A stateful connection is one in which information about a connection, or a request for information, between two systems is retained at the first device for future use. A stateless connection is one in which no information is retained by either sender or receiver. The sender or user (initiator) transmits information or a request to the receiver (target) and does not expect an acknowledgment of receipt. The receiver receives the packet without knowledge of any prior activity of the user.

Where a user requests information from a server, for example, by sending a read request to a data base manager, the user processer may wait for the request to be fulfilled by the server. That is, the sequential operation of the user program is suspended until such time that the data that has been requested is returned, or an error message is generated by the server where a fault of some kind is encountered. Depending on the design of a system watchdog timers or other measures may be used to ensure that a user process, for example, does not wait indefinitely for a response or error message from a data base server. On the other hand, data base servers are commonly plagued with latency problems due to disk access latency, competing user requests, or the like, and a fairly long period of time may be established in the protocol before the user takes some action that presumes a failure of the request to be performed. This time is typically a multiple of the expected latency time of the successful completion time period. In the case of systems using mechanical disks, responses in less than several milliseconds are not expected, and so the watchdog times might be set for a substantial portion of a second. The request may be repeated a number of times before the user program reports a fault Where a user requests information (e.g., a page of data stored by a server), the user waits for the request to be fulfilled. The response of the server normally includes the completion status of the request and the information. In the case of an error, the response would include an error code. To prevent the user program from being blocked from further operation by the failure of the server without having provided a response, many user applications provide for a retry after a time out interval.

SUMMARY

A method of managing a server with a stateless connection to a user, comprising: providing a server computer having a communications interface with a user computer; and a memory system Responding to a request for a service from the user computer by receiving a user request from the user computer over a communications interface; and, executing a task to respond to the user request. The task is divided into a plurality of comprising a plurality of sub-tasks, each sub-task having one or more subsidiary tasks. Sub-tasks report the completion status of associated subsidiary tasks to a supervisory sub-task whenever a subsidiary task is completed, where the completion status of each subsidiary task is one of a successful completion or a failure to successfully complete the subsidiary task, and the supervisory task determines the completion status of completed subsidiary tasks each time that either a subsidiary task or a sub-task completes. The main task is considered to have completed when all of the subsidiary tasks have successfully completed. However, a failure of any one of the subsidiary sub-tasks to successfully complete causes the mail task to fail to complete upon the completion of the failed subsidiary sub-task.

BRIEF DESCRIPTION OF THE DRAWINGS

FIG. 3A is an example of a status matrix of task completion and success where at least one sub-sub-task has failed to complete successfully;

FIG. 3B is an example of a status matrix of task completion where all of the sub-sub-tasks have completed successfully.

DETAILED DESCRIPTION

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

Figure 1:
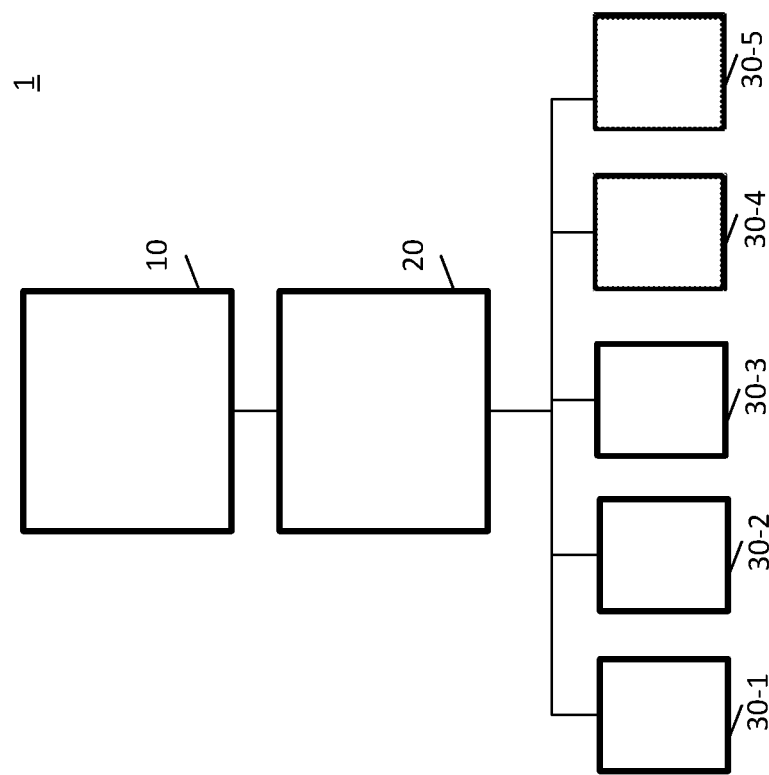
FIG. 1 is a block diagram of a system where a user computer is in communication with a server computer.

In an example, a computer system 1 (FIG. 1) may comprise a user computer 10 in communication with a server computer 20 which has a plurality of rotating media disk storage devices 30. The "disk storage devices" may also be solid state disks (SSD), FLASH memory modules, an all flash array (AFA) or the like, configured to store data from the user and return data to the user upon in response to requests initiated by the user computer 10.

Figure 2:
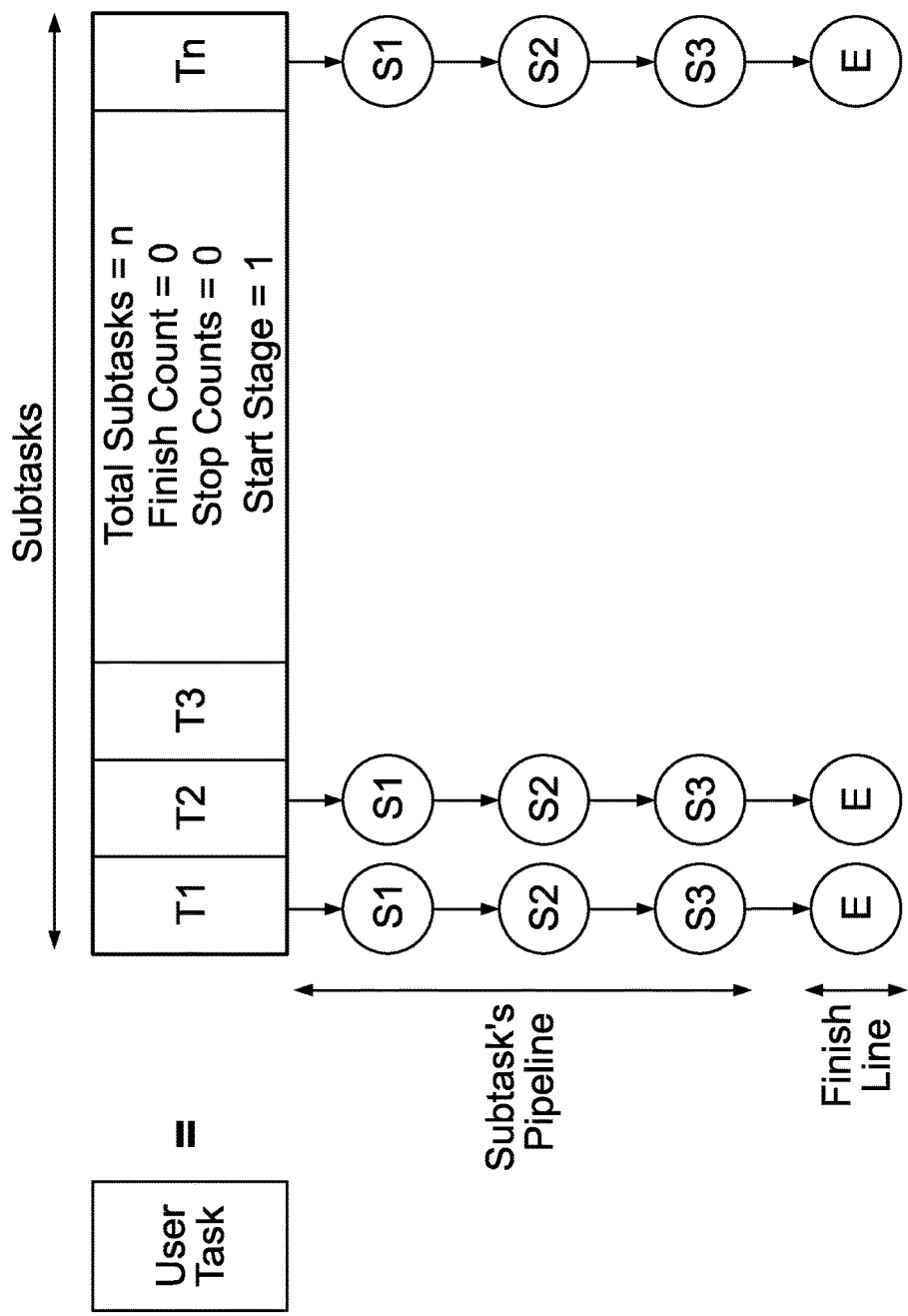
FIG. 2 illustrates the decomposition of a task into sub-tasks and further into sub-sub-tasks.

A server task executing on the server computer 20 in response to a request from the user computer 10, which may be an external request for a read operation from a storage system 30 initiated by the user, may be divided into a plurality of sub-tasks, at least some of which may be capable of being performed contemporaneously. Each of these sub-tasks T may be further comprised of several additional secondary sub-tasks S, alternatively referred to as subsidiary tasks, which may be either performed sequentially or in parallel or in a combination of contemporaneous operations, as shown in FIG. 2.

Whenever an error, or a time out, or similar defined event, occurs in one of the sub-tasks T or secondary sub-tasks S, there is a benefit to recognizing the situation as soon as practicable, so as to report the error to the user or requestor, or to terminate related sub-tasks or secondary sub-tasks whose results are no longer useful. Promptly reporting a server task error to a requesting user task that is suspended from operation while waiting for a response from the server reduces the latency of the requesting program. That is, the user may repeat the request, enter a fault handling mode, or the like. Similarly, terminating related sub-tasks and secondary sub-tasks at the server speeds initiation of recovery mechanisms if such are provided, or eliminates computations, memory and storage accesses and the like which are no longer useful subsequent to reporting the error.

In an example, a task T that is received by a server, for example, may be broken up into a plurality of subtasks Tn to be performed. These tasks may be denoted T1, T2, Tn, some of which may be capable of being executed independently of each other. In a disk system 30, for example, where the data has been stored in RAIDed format, the requested data may be stored on a plurality of disks and parity check data recorded on another disk in a RAID group. The data may be stored in chunks on four disks (e.g., 30-1, . . . , 30-4) and the parity data stored on a fifth disk (e.g., 30-5). When a request for the data is received, the data may be retrieved in a variety of ways. The example described here may be only one of many approaches to performing the task, and is not suggested as more than a simple illustration of the method. A person of skill in the art will be able to adapt the method to the particular tasks being designed.

Where the user task T (e.g., retrieve a page of data stored in a RAID group) is being performed in a sequential manner, each sub-task Tn waits for the previous sub-task Tn−1 to complete. When all of the sub-tasks have completed, the result is returned to the requesting program, for example, the user. A fault or time out in a sub-task wastes the time line and resources associated with already completed sub-tasks as no final result can be reported. The reporting of the fault or time out is also delayed until it has occurred in the time line of sequential execution of the tasks Tn. The task may sequentially request a chunk from disk 1 (T1), wait until the action has been performed, request a chunk from disk 2 (T2), wait until the action has been performed, and so forth. Once all four of the chunks have been successfully retrieved, the result is returned to the user. But, if there is a fault, such as a data read error or a time out due to a queue of requests to one of the disks, the task has a recovery mechanism, which may be to then request the parity data from the disk 5 (T5). If there is a failure in only one of the requests to read data from a disk, a single-parity RAID system can reconstruct the missing data, as is known, using an exclusive-OR computation. But, the request to disk 5 (T5) may be delayed until one can determine that data from only one disk has not been received (only one of the tasks T1-T4 has reported an error or a time out).

As each one of the disk requests has a latency due to access time, which may be significant with respect to the computational capability of the processor, the user processor 10 may spend a considerable amount of idle time waiting for responses from the server 20 and the CPU utilization efficiency may suffer.

In another example, the task T may be broken up into a plurality of sub-that are configured to be executed contemporaneously. The tasks T1, T2, . . . Tn may be independent tasks whose execution may start contemporaneously and may themselves be comprised of secondary sub-tasks TnSn (illustrated as the vertical strings in FIG. 2). For ease of explanation the secondary sub-tasks TnSn of a task Tn will be presumed to execute sequentially, while the sub-tasks Tn may be executed contemporaneously, or substantially in parallel. When all of the sub-tasks Tn have competed successfully, the requested result has been obtained.

The previous example of retrieving a page that has been stored in a RAID group is again used to illustrate the method. In this circumstance, one may configure four identical sub-tasks T1, T2, T3, and T4, each task retrieving a chunk of data from one of the four disks storing the data. Each task T1, T2, T3, T4 requests the chunk of data from a disk, receives the data, determines if the read request was performed without an error by, for example, using or receiving the result of an error correcting code, checking for a time out or performing other actions related to the chunk of data, which might have included a physical location on the disk or in another memory where the data is stored, decrypting, decompressing, or the like. Each of these sub-tasks may encounter a variable latency due, in this instance, to queueing, to disk-access latency, and to the sequence in which the tasks T1 . . . T4 complete processing each time the main task T is executed. So, a supervising portion of main task T may have to wait for a predetermined time before determining that an error or time out has occurred. Nevertheless this parallel operation is more efficient that the first described approach as much of the latency periods of the plurality of disks overlap, subsuming a portion of the latency.

But, after a timeout, error, or other failure by one of the sub-tasks T1 . . . T4, task T5 may need to request data from disk 5 so as to reconstruct the data that has not been received from one of the other disks (T1-T4) in a timely manner. The data from T5 is not normally required, and so it may be inefficient to request data from T5 each time task T is performed, and then discard the result, as executing T5 creates unnecessary activity on one of the disks of the RAID group. So task T5 may now be performed to obtain the parity data and to compute the missing data to respond to the user request only when necessary.

The sub-task T1, for example, may be decomposed into a plurality of secondary sub-tasks TnSn which may be performed in sequence, in parallel, or in a combination of the two. In the above example, the task T1 may be comprised of secondary sub-tasks, request data (S1), receive data (S2), validate data (S3), and report data (S4) executed sequentially, while a time out secondary sub-task (S5) operates in parallel, when the secondary subtasks S1-S4 complete, the subtask T1 has completed successfully. Alternatively if subtask S5 completes prior to the completion of subtasks S1-S4, there is a time out error, and sub-task T1 completes with an error report.

This process may be made more efficient if each of the secondary sub-tasks T1S1, . . . , T1S4 can report an error in a secondary sub-task TnSn at the time that it occurs rather than waiting for T1S5 to complete. Each secondary sub-task S may report successful completion by setting a flag in a matrix or merely by transferring control to the next secondary sub-task or returning to the parent sub-task, and may report a fault by setting flag in the matrix or returning an error message to the parent sub-task.

In an example, each sub-task Tn may check the status matrix when each of its associated secondary sub-tasks TnSn completes so as to determine whether ether has been an error in any of the secondary sub-tasks associated with other sub-tasks. If an error flag is encountered, in a simple example, the sub-task would find an error flag in the status matrix and could terminate pending secondary sub-tasks and return a termination flag to a status matrix being checked by the supervisory main task T. The pending sub-tasks may also be terminated, when, for example one of their secondary sub-tasks completes.

By updating the status matrix when any secondary sub-task completes, or when any sub-tasks encounters an error, an error in any secondary sub-task is communicated to each of the sub-tasks Tn rapidly or to the main task T. In this case, the action occurs when the next secondary sub-task of any of the sub-tasks completes. This particular implementation waits for the completion of secondary sub-tasks, and does not initiate the next sequential secondary sub-task once an error occurs. This is not a requirement where a secondary sub-task is capable of being aborted.

FIG. 3A shows a status matrix maintained by the server task T, where the tasks T1-T5 are performed sequentially, and showing the state where secondary sub-tasks T1S1-T1S5 and T4S1-T4S5 have been successfully completed. T3S1-T3S4 have completed, but T3 S5 indicates that a time-out error, for example, had occurred (F=1). Tasks T2S1-T2S3 completed successfully, but an error occurred in T2S4 and T2S5 has not as yet timed out. Sub-task T5 may be used to monitor the remaining sub-tasks. In this case, T5S1 has detected a failure in a secondary sub-task of one of the other sub-tasks (in this example either T2S4 or T3S5, whichever one had occurred first). If the main task T checks this status matrix after each sequential sub-task completes, the first error encountered can be used to terminate the main task T and return an error message to the requesting program.

In contrast, FIG. 3B shows the matrix status where all of the sub-tasks and sub tasks have successfully completed.

While the present example shows the same number of secondary sub-tasks, generally each of the sub-tasks Tn may have a different number of secondary sub-tasks Sn, depending on the actual functions being performed by the parent sub-task. Tasks T1-T4 may be, for example, being performed in parallel, and T5 may be performing other functions, or monitoring the status matrix and at the completion of the prior task, may report the result to the user. The method provides for reporting a failure in the task requested by the user, without waiting for all or large portions of the processing to be completed or to time out or to encounter a failure.

Figure 4:
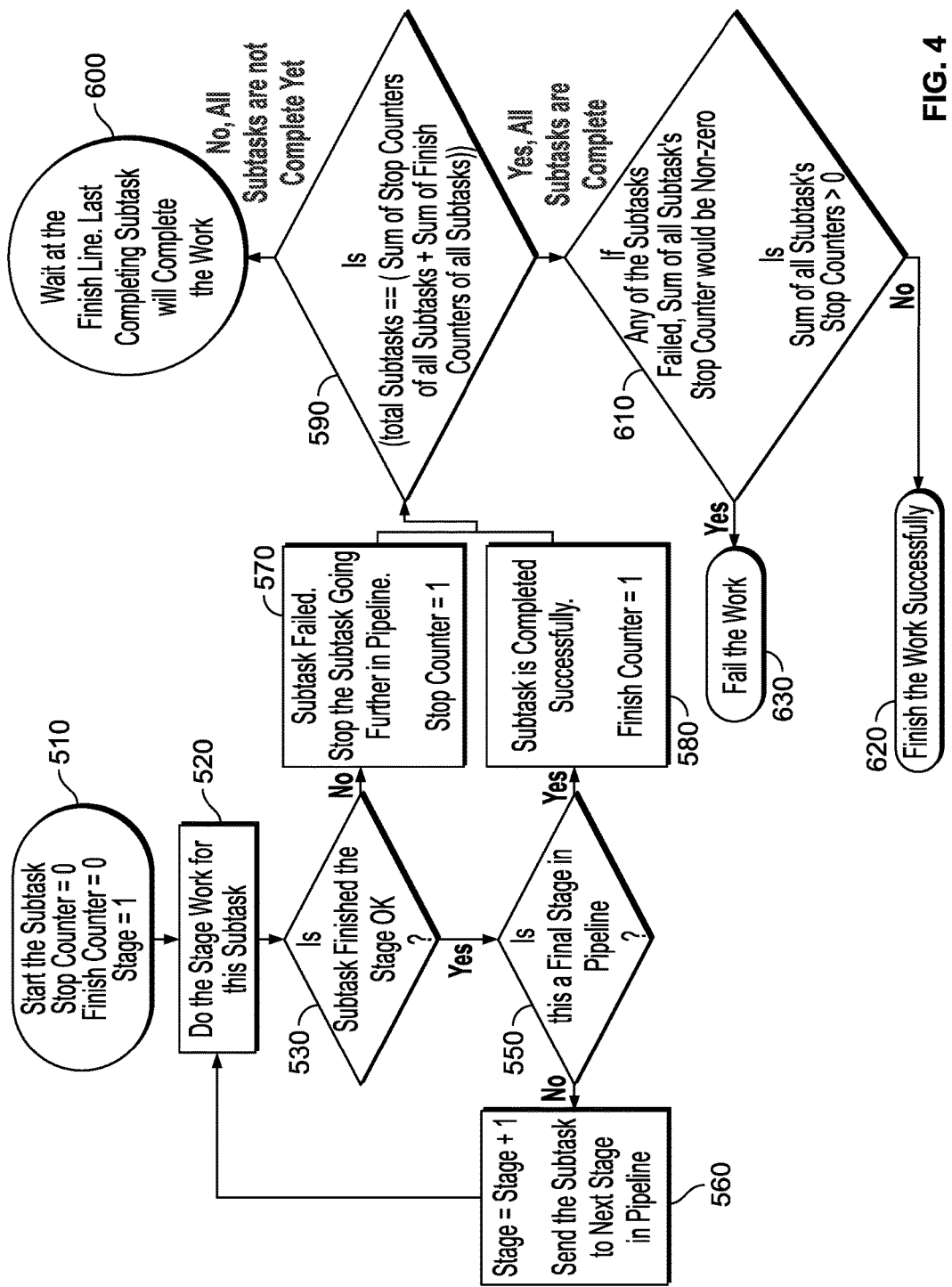
FIG. 4 is a flow chart illustrating an example of the method where the failure of a sub-sub-task to successfully complete prior to all of the sub-sub tasks completing results in a failure of the task.

In an aspect, the details of managing the entries in the matrix may be understood with respect to FIG. 4, where each secondary sub-task may be considered as a stage of a parent sub-task and the stages are executed in sequence. The first stage of the plurality of stages of a sub-task is initiated (510) and performs a sub-task (520). When the stage completes (530) the status of the stage is determined and if the stage completed successfully, the method determines whether the stage is the last stage of the sub-task (550). If further stages are to be performed (550, N), control is transferred to the next stage (560) and the execution of the stages continues until either the last stage of the sub-task is completed (550, Y) or an error is encountered in performing the stage (530, N).

Where the result is (530, N) or (550, Y) a stop counter (570) or a finish counter (580) is incremented, respectively. When either of the counters is incremented, the counter states are inspected (590) to determine whether the event was caused by the completion of a subtask Tn or by an error in the performance of a stage of a sub-task. So, when the result of test 590 is that the stop counter is zero and the finish counter is less than the total number of sub-tasks of the task T (590, N), the components of the task (all of the stages of all of the sub-tasks that have already been performed have been performed successfully) and the process waits (600) for the next counter event. However, when event causes test 590 to be performed and one of the finish counter count is equal the number of sub-tasks and the stop counter is zero (610, N); or the stop counter is not zero (610, Y), then the task has either been completed successfully (620) or failed (630) due to an error in a stage of one of the sub-tasks, respectively. This may be immediately reported to the requesting task.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP, array processor, or the like, that acts on the instructions to perform functions and actions described herein.

Alternatively, the operations might be performed by specific hardware components that may have hardwired logic or firmware instructions for performing the operations described, or by any combination of programmed computer components and custom hardware components, which may include analog circuits. Such components may include Application Specific Integrated Circuits (ASIC), Field Programmable Gate Arrays (FPGA), or the like which may exist or are being developed and have the capability of configurable logic.

The methods may be provided, at least in part, as a computer program product that may include a non-volatile (non-transient) machine-readable medium having stored thereon instructions which may be used to program a computer (or other electronic devices) to perform the methods. For the purposes of this specification, the terms "machine-readable non-transient medium" shall be taken to include any medium that is capable of storing or encoding a sequence of instructions or data for execution by a computing machine or special-purpose hardware and that may cause the machine or special purpose hardware to be operable to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; Flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

For purposes of claim interpretation, the memory for storing a computer program product is "non-transient," where such a definition is given the broadest interpretation in terms of applicable memory types and techniques consistent with governing case law. Functions that are performed by a computer operable to process and execute the code may be equivalently performed by an electronic circuit.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

When methods are described, and a listing of steps to be performed is given, it should be understood that the ordering of the steps is illustrative and steps the method may be combined, omitted, reordered, repeated or the like without departing from the teachings of the disclosure. Similarly, in the claims, the use of letter or numerical identification of clauses is for clarity in description and does not imply a restriction on the sequence of performance of the steps in the method.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A method of managing a server with a stateless connection to a user, the method comprising:
   providing a server computer having a communications interface with a user computer; and
   a memory system,
      wherein responding to a request for a service from the user computer comprises:
      receiving a user request from the user computer over a communications interface;
      executing a task by the server computer to respond to the user request, the task comprising a supervisory task and a number of sub-tasks, each sub-task of the number of sub-tasks having one or more subsidiary tasks; and
      configuring each sub-task to report a completion status of each subsidiary task and completion of the sub-task to the supervisory task each time a subsidiary task completes;
      wherein a completion status of a subsidiary task is one of success or error, and the supervisory task determines the completion status of each subsidiary task at the completion time of the subsidiary task prior to completion of the sub-task and,
      the supervisory task is configured to report an error in completion of the subsidiary task of the sub-task to the user computer if the completion status of the subsidiary task is error, wherein the error terminates or aborts execution and completion of the sub-task and other sequential subsidiary tasks of the sub-task;
      wait for another completion status change when a number of completed sub-tasks is less than the number of sub-tasks; and
      respond to the user request over the communications interface when a number of successfully completed sub-tasks is equal to the number of sub-tasks.

2. A computer program product, stored on a machine-readable non-transitory medium, comprising:
   instructions executable by a computer to determine a status of a task program,
   wherein the task program is configured as a plurality of sub-tasks and the sub-tasks are configured as a number of subsidiary tasks, which execute contemporaneously;
   a supervisory sub-task of the task program monitors a completion status of each subsidiary task and the completion status is one of successful completion or error; and
   wherein completion of each subsidiary task of the plurality of subsidiary tasks results in an evaluation of the completion status of the completed subsidiary task by the supervisory sub-task; and, the supervisory sub-task is configured to:
   report the completion status of the task program as a failure when the completion status of error is reported by the subsidiary task, wherein the failure terminates or aborts execution of the supervisory task and any other subsidiary tasks of the supervisory task;
   complete the task program when a number of subsidiary reporting successful completion is equal to the number of subsidiary tasks; and
   wait for another completion status change when a number of subsidiary tasks reporting successful completion is less than the number of subsidiary tasks.

3. The method of claim 1, wherein the subsidiary tasks are further configured to:
   set completion flags in a status matrix when the subsidiary tasks are successfully completed; and
   set error flags in the status matrix when an error is detected in the subsidiary tasks.

4. The method of claim 3, wherein any set error flags in the status matrix terminates or aborts uncompleted sub-tasks.

5. The method of claim 3, wherein the supervisory task is further configured to:
   check the status matrix after completion of each of the sub tasks subsidiary tasks; and
   terminate the task when any of the error flags are set in the status matrix.

* * * * *